US008098588B1

(12) United States Patent
Berndt et al.

(10) Patent No.: US 8,098,588 B1
(45) Date of Patent: Jan. 17, 2012

(54) BLIND ADAPTIVE DECISION FEEDBACK EQUALIZER FOR HIGH-SPEED SERIAL COMMUNICATIONS

(75) Inventors: Charles E. Berndt, Ottawa (CA); Tad Kwasniewski, Ottawa (CA)

(73) Assignee: Altera Corporation, San Jose, CA (US)

( * ) Notice: Subject to any disclaimer, the term of this patent is extended or adjusted under 35 U.S.C. 154(b) by 1134 days.

(21) Appl. No.: 11/869,680

(22) Filed: Oct. 9, 2007

(51) Int. Cl.
*H04L 12/26* (2006.01)
(52) U.S. Cl. .......................... 370/252; 370/488
(58) Field of Classification Search .......... 370/229–235, 370/248–252, 488
See application file for complete search history.

(56) References Cited

U.S. PATENT DOCUMENTS

2009/0153382 A1* 6/2009 Philips ........................ 341/143
2009/0201826 A1* 8/2009 Gorokhov et al. ............ 370/252

OTHER PUBLICATIONS

Berndt, C.E., "Blind Adaptation of a Decision Feedback Equalizer for use in a 10Gbps Serial Link: A Thesis Submitted to the Faculty of Graduate Studies and Research in Partial Fulfillment of the Requirements for the Degree of Masters of Applied Science, Department of Electronics, Carleton University, Ottawa, Canada" (Aug. 8, 2007).
Berndt, C.E., "Blind Adaptation of a Decision Feedback Equalizer for use in a 10Gbps+ Serial Link: A Masters of Applied Science Thesis Defense Presentation" (Jan. 15, 2007).

* cited by examiner

*Primary Examiner* — Phuc Tran
(74) *Attorney, Agent, or Firm* — Ropes & Gray LLP; Jeffrey H. Ingerman

(57) ABSTRACT

A blind adaptive decision feedback equalizer technique relies on two thresholds. The first threshold is applied to the incoming sampled analog data. According to this aspect of the invention, if the signal magnitude exceeds the threshold, then it is considered valid, while if it is below the threshold, it is considered erroneous. This reduces processing, because not every sample generates an error signal. The second threshold is a block threshold that determines when the filter coefficients are updated to account for the incoming data. In accordance with this aspect of the invention, only when a certain number of errors has been accumulated are the coefficients updated. This results in a further reduction in processing.

19 Claims, 7 Drawing Sheets

BLIND ADAPTIVE DECISION FEEDBACK EQUALIZER FOR HIGH-SPEED SERIAL COMMUNICATIONS

BACKGROUND OF THE INVENTION

This invention relates to a blind adaptive decision feedback equalizer for high-speed serial communications, particularly in a high-speed serial interface of a programmable integrated circuit device.

It has become common to include embedded high-speed serial interfaces in programmable integrated circuit devices such as programmable logic devices (PLDs), programmable microcontrollers, etc. Higher data volumes demand high-speed, high-throughput data processing. Serial communication reduces the number of pins and parallel lines on a device, therefore, reduces the overall cost of the device and removes the problem of data skew in parallel lines.

In such interfaces, many different signalling schemes may be used, including binary, Non-Return to Zero (NRZ), multi-level Pulse Amplitude Modulation (e.g., 4-PAM), and Duo-Binary. However, as data rate increase, particularly into the gigabit range, these may prove inadequate because of, e.g., severe Inter-Symbol Interference (ISI), strong attenuation, data-dependent performance, and crosstalk.

Severe ISI, in particular, requires the use of specialized recovery circuits. Various types of recovery circuits are available, and are classified according to their location. Pre-Emphasis or De-Emphasis circuits may be used at the transmitter end. Forward Equalization (e.g., R-C/FFE) circuits and Decision Feedback Equalizer (DFE) circuits may be used at the receiver end.

Of these, DFE is generally regarded as the most powerful at removing Post-Cursor ISI. This is in part because DFE does not require Pre-Emphasis, which aggravates crosstalk in the channel. In addition, DFE does not add up high-frequency noise the way that, e.g., finite impulse response (FIR) filtering may do.

However, many existing DFE techniques require training. "Blind adaptive" techniques that do not require training also are known, but may be insufficiently discriminating as between valid and erroneous signals.

SUMMARY OF THE INVENTION

According to the present invention, a blind adaptive DFE technique, that does not require training, but that more accurately distinguishes between valid and erroneous signals is provided. Unlike known blind adaptive techniques which generate an error for almost every sample, the blind adaptive DFE technique according to the invention preferably relies on two thresholds, rather than on the traditional error generation method.

The first threshold is applied to the incoming sampled analog data. According to this aspect of the invention, if the signal magnitude exceeds the threshold, then it is considered valid, while if it is below the threshold, it is considered erroneous. This reduces processing, because not every sample generates an error signal.

The second threshold is a block threshold that determines when the filter coefficients are updated to account for the incoming data. In accordance with this aspect of the invention, only when a certain number of errors has been accumulated are the coefficients updated. This results in a further reduction in processing.

Therefore, in accordance with the present invention, there is provided a blind adaptive decision feedback equalizer method for filtering an analog input data signal to provide a decided digital data output. The method includes storing a first plurality of previous decided digital data samples, summing the analog input data signal with a number of terms, equal to the first plurality, each derived from one of the previous decided digital data samples, to produce a filtered analog input data signal, and digitizing the filtered analog input data signal to produce the decided digital data output. Each of the terms is derived by multiplying each respective stored previously decided digital data sample by a respective coefficient determined by applying to the filtered analog input data signal an error generation function that assigns (a) a first error value to a positive filtered analog input data signal having a magnitude less than a first threshold, (b) a second error value to a negative filtered analog input data signal having a magnitude less than the first threshold, and (c) a third error value to a filtered analog input data signal having a magnitude at least equal to the first threshold. The assigned error value and the respective stored previously decided digital data sample are supplied to respective adaptation logic to generate a respective coefficient update. Each respective coefficient update is outputted to a respective coefficient.

According to one embodiment, the coefficient update is outputted only after a certain number of updates have occurred.

A filter circuit for performing the method also is provided.

BRIEF DESCRIPTION OF THE DRAWINGS

Further features of the invention, its nature and various advantages, will be apparent upon consideration of the following detailed description, taken in conjunction with the accompanying drawings, in which like reference characters refer to like parts throughout, and in which.

DETAILED DESCRIPTION

A DFE filter having a certain number of taps can remove ISI contributions from that number of most-recently transmitted symbols. The coefficients for each tap may be built in or programmed at initial installation or setup, or they may be derived adaptively. The latter is known as adaptive equalization.

There are several different techniques available for adaptation, including Recursive Least Square (RLS) and Least-Mean Square (LMS). LMS has at least two variants:

Full LMS: $C(n+1)=C(n)+2\mu \cdot e(n) \cdot d(n)$

Sign-Sign LMS: $C(n+1)=C(n)+2\mu \cdot \text{sgn}[e(n)] \cdot \text{sgn}[d(n)]$ where C(n+1) is the new coefficient, C(n) is the previous coefficient, $\mu$ is a convergence factor, d(n) is the decided data signal (i.e., the digital signal derived from the nth sample), e(n) is the error signal associated with the nth sample, and sgn[x] is a sign function that returns +1 for x>0 and −1 for x<0.

Because the sign function returns either a +1 or a −1 regardless of the magnitude of the error, all errors are treated equally under the Sign-Sign LMS approach. The present invention improves upon the Sign-Sign LMS technique by ignoring errors where the signal exceeds a predetermined threshold, which may be adjustable or programmable.

Figure 1:
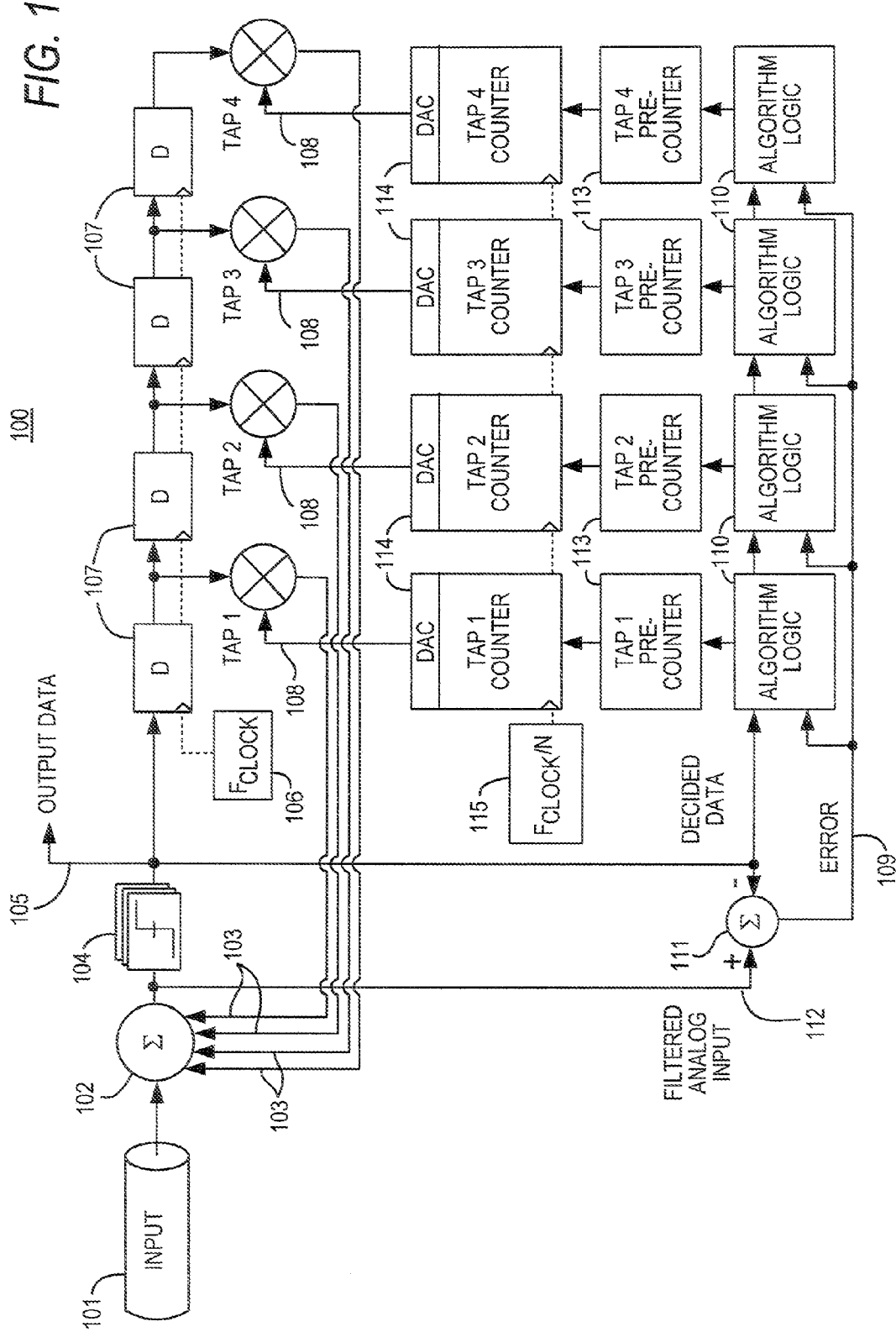
FIG. 1 shows a known blind adaptive DFE filter of which the present invention is an improvement.

The existing technique may be understood by reference to FIG. 1 which shows a known blind adaptive DFE circuit 100. Analog data are input at 101 and filtered at summation node 102 by coefficients 103. The data are digitized at 104 and output at 105, but are also clocked by $F_{clock}$ 106 into delay registers 107 and used to derive coefficients 103 for filtering subsequent incoming data.

The coefficient 103 is determined for the datum in each delay register 107 by multiplying that datum by a tap value 108 derived, from the datum and its error signal 109, using logic 110 that implements the adaptation algorithm. Error signal 109 is derived at 111 by subtracting the decided digital datum 105 from the filtered analog input signal 112.

In a technique known as block adaptation, the tap values 108 are not updated until a block of N tap value updates is clocked into pre-counters 113. If the data are sampled only once per clock cycle or baud period, then this is equivalent to saying that the tap values 108 are not updated until N clock cycles have elapsed. The number, N, may be programmable and may be a component of the aforementioned convergence factor, $\mu$. As the data in the block are clocked through the various delay registers 107, corresponding algorithm logic units 110 compute tap update values, which are output to corresponding pre-counters 113. However, the values in pre-counters 113 are not used to update the tap values 108 until N data samples have been clocked in, after which the values in pre-counters 113 are use to update (by +1 or −1) tap counters 114. This is achieved by dividing the data clock 106 ($F_{clock}$) by N and using the divided clock 115 to clock tap counters 114.

Figure 2:
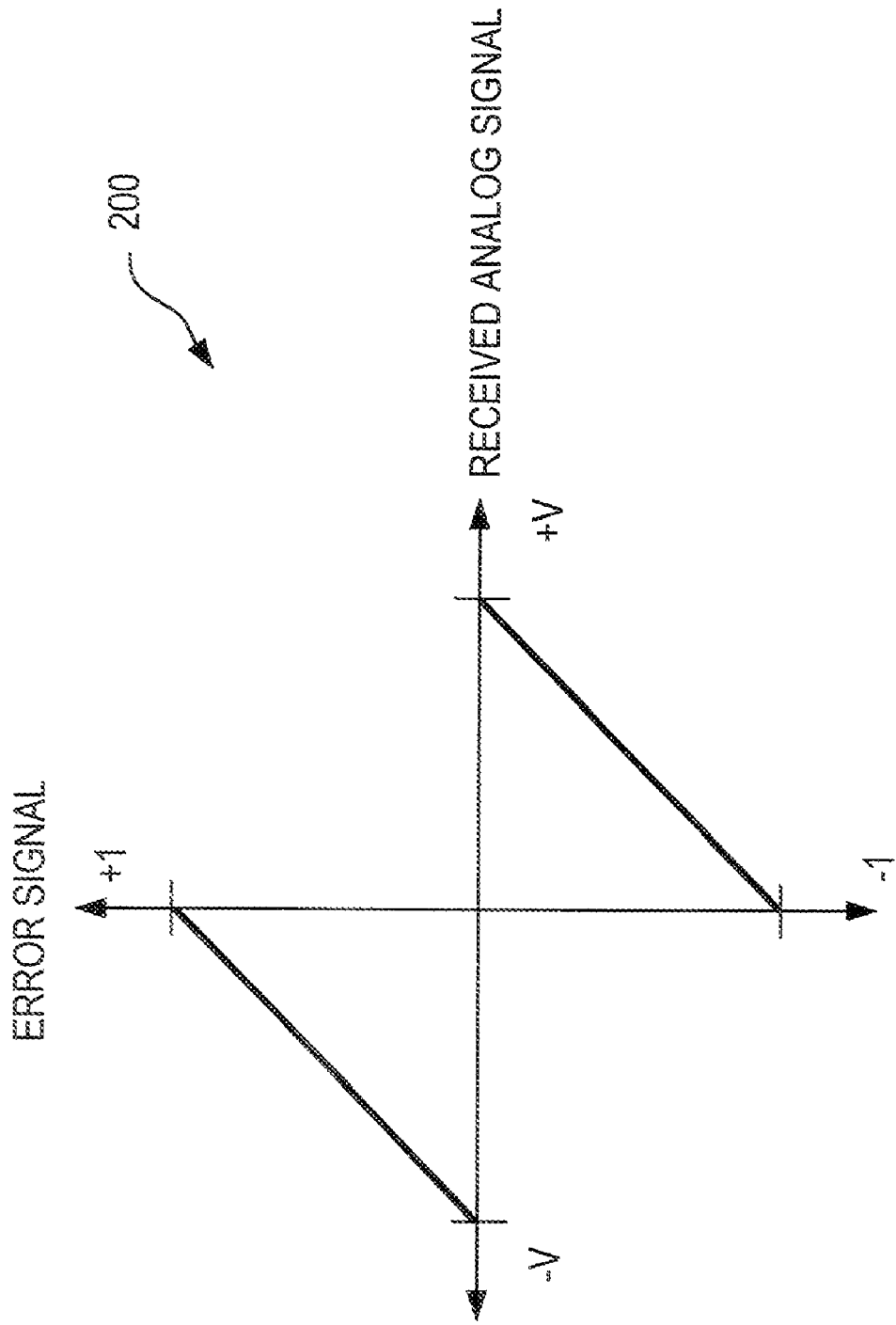
FIG. 2 shows a known error generation function as may be used with the known filter of FIG. 1.

Because all samples are treated identically for error generation purposes as discussed above, all samples generate some error. In a non-return-to-zero (NRZ) system, where digitized data samples 105 are either +1 or −1, and the analog signal 112 is treated at subtractor 111 as a normalized signal by dividing the analog magnitude by the analog value that nominally corresponds to a +1 (e.g., +5 volts in a TTL system), the error curve 200 is that shown in FIG. 2. Thus, for a positive analog signal equal to the peak value that corresponds to a +1, the error is 0, but for any other positive analog signal value, the error is that value minus +1, or some negative number between 0 and −1. Similarly, for a negative analog signal equal to a peak value that corresponds to a −1, the error is 0, but for any other negative analog signal value, the error is that value minus −1, or some positive number between 0 and +1.

In fact, however, for a signal whose analog magnitude is close to the peak value, treating that signal as a ±1 is rarely an error. On the other hand, when the analog amplitude is low is there a larger chance of error. Therefore, in accordance with the present invention, errors are generated according to function 300 shown in FIG. 3. Specifically, where V is the analog voltage indicating a "1", for positive signals with a voltage below Y, an error of −1 is assumed, for negative signals with a voltage above −Y, an error of +1 is assumed, and for signals with an absolute value between Y and V, no error is assumed. This is illustrated graphically in FIG. 4.

Figure 3:
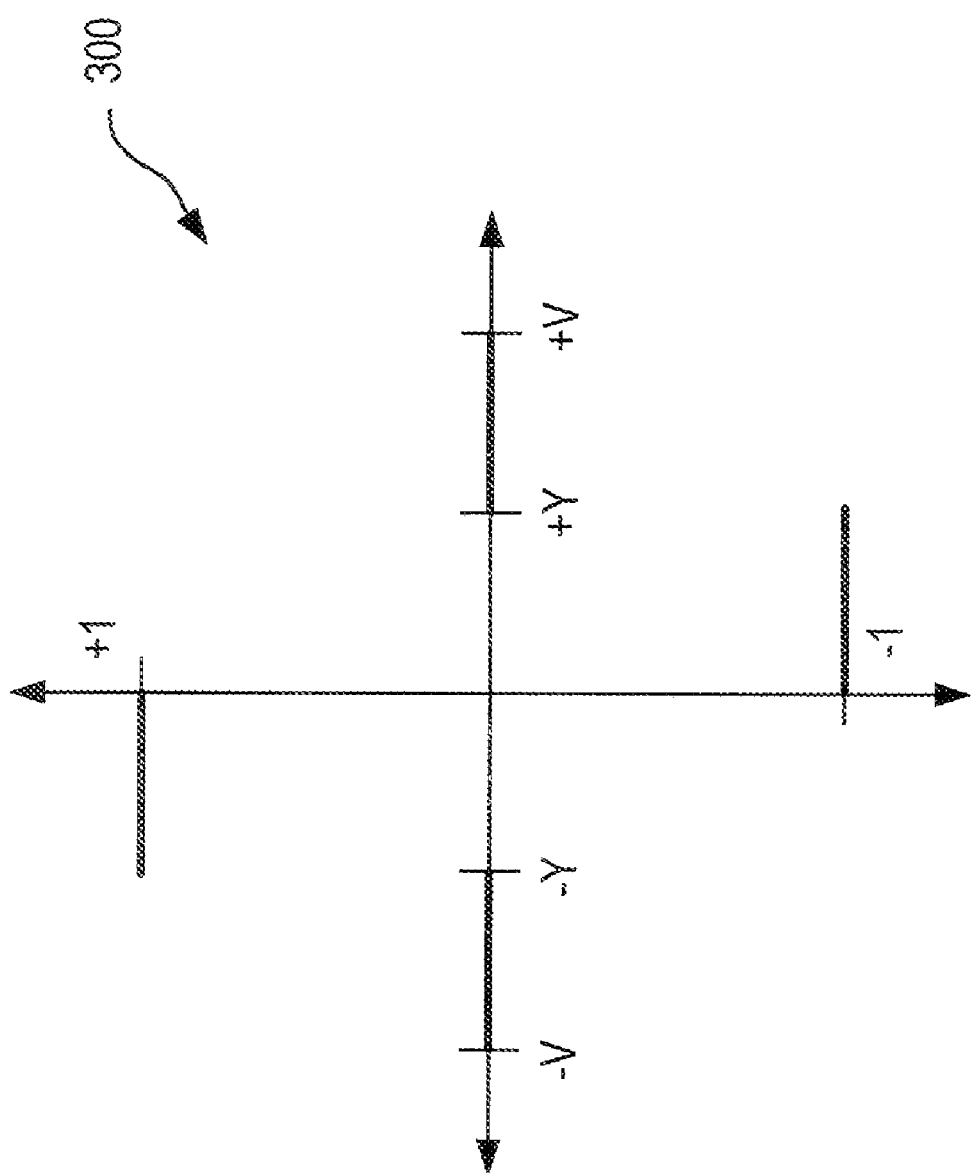
FIG. 3 shows an error generation function in accordance with an embodiment of the present invention.
Figure 4:
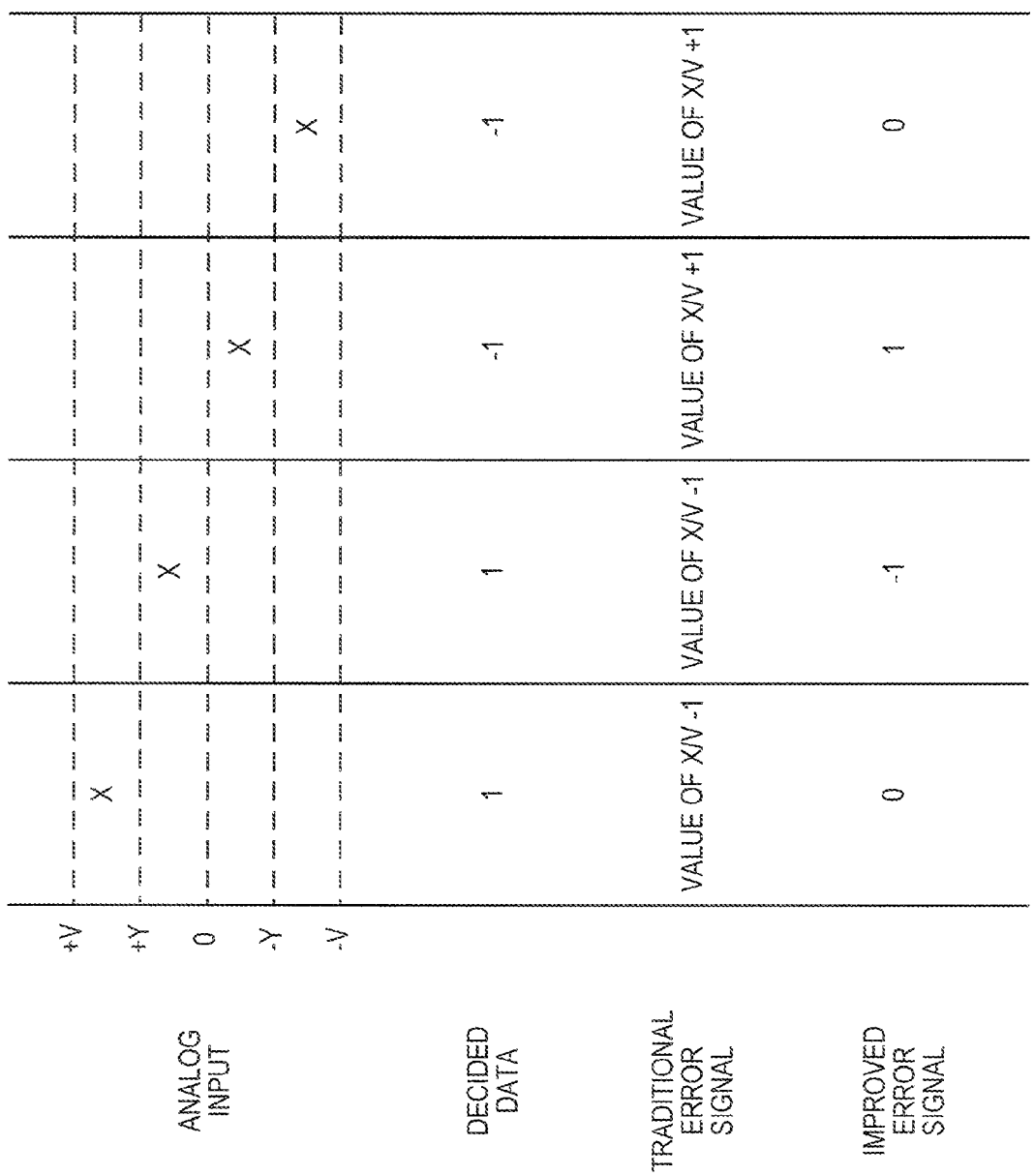
FIG. 4 is a graphical comparison of errors generated in accordance with the functions of FIGS. 2 and 3.

As may be apparent, especially from a comparison of FIG. 3 and FIG. 4, not only does the previously known technique assign an error value when an error value may not be warranted, but in a normalized system, each of those calculations is computationally intensive as the signal value must be normalized relative to ±V. Moreover, this is achieved without a two-stage operation as in the traditional error generation method (FIG. 3). That method required using a comparator with single threshold of "0" to make a sign decision and then using an error calculation unit to compute an error value. That two-stage process limited high-speed operation, because the error calculation unit could not start computing an error value until the sign decision had been made. The single-stage process of present invention, which uses a comparator having three thresholds (−Y, 0, +Y) is therefore faster than the traditional method.

The value of Y may be programmable, particularly when circuitry for applying the technique of FIG. 4 is part of a programmable device.

Figure 5:
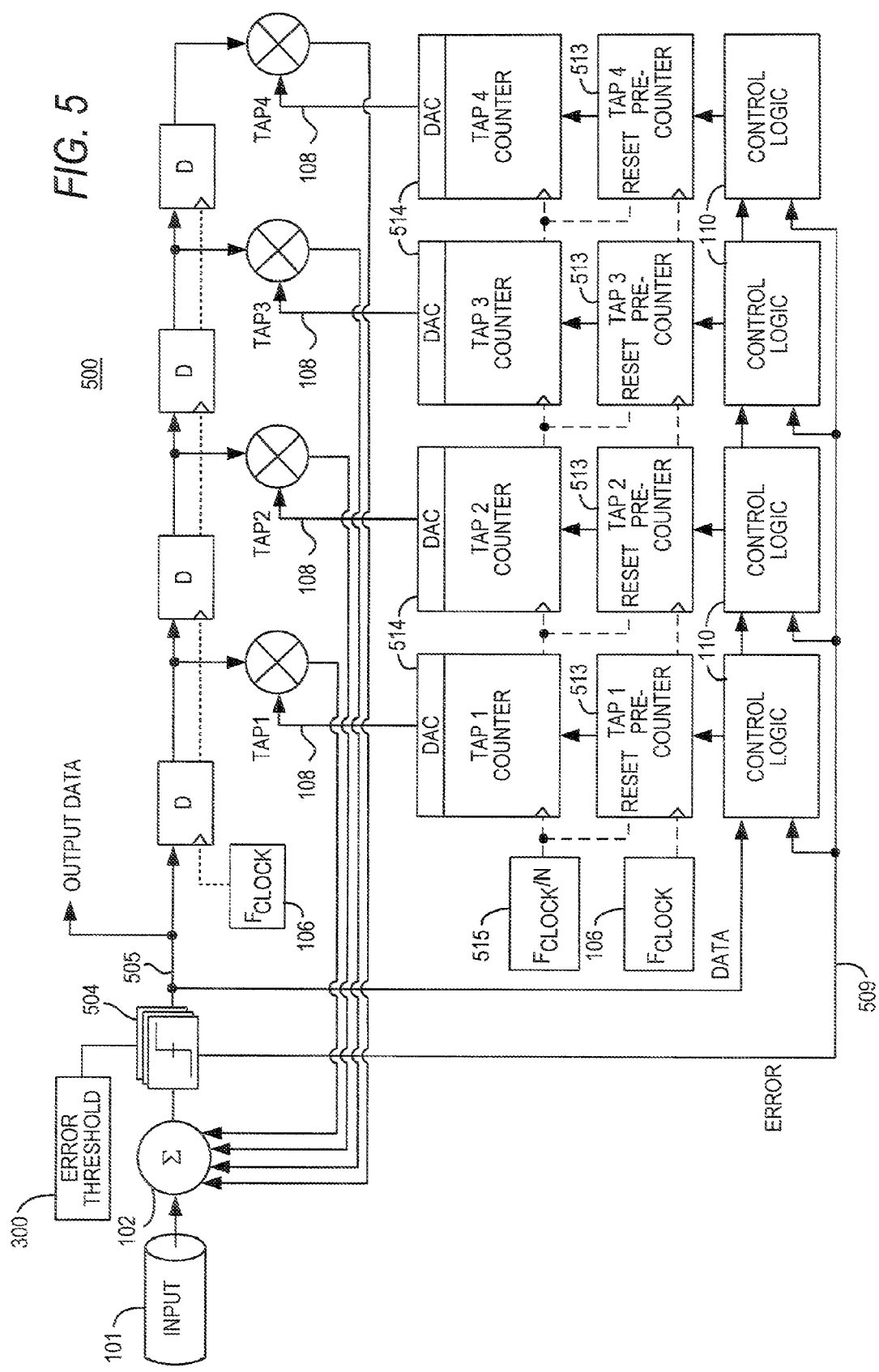
FIG. 5 shows a blind adaptive DFE filter in accordance with an embodiment of the present invention.

A blind adaptive DFE circuit 500 according to the invention is shown in FIG. 5. Circuit 500 is similar to circuit 100, but instead of deriving the error signal by subtracting the output of analog-to-digital converter 104 from its input, the error is derived by application of the error function 300 directly at analog-to-digital converter 504, which outputs not only decided digital data 505, but also error signal 509, which is supplied to logic units 110 as in circuit 100.

Figure 6:
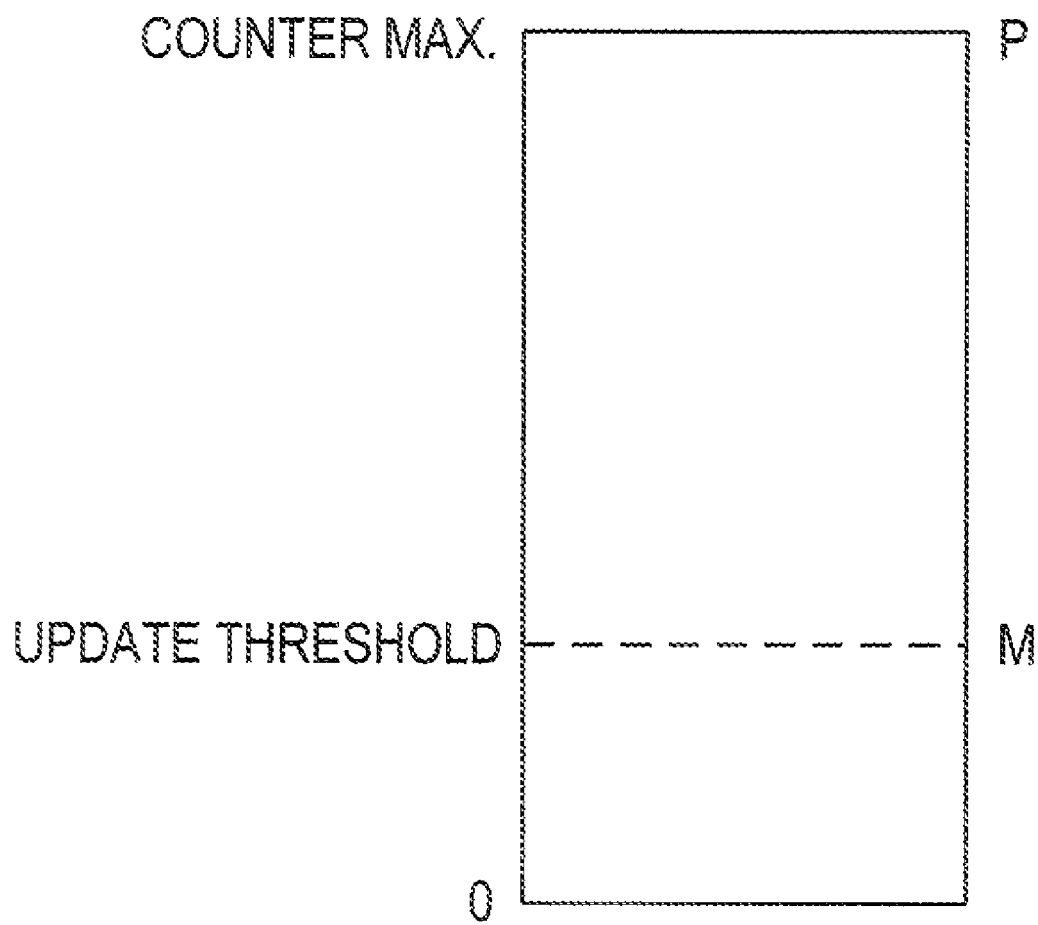
FIG. 6 is a graphical representation of an update threshold in accordance with an embodiment of the present invention.

At that point, an arrangement of pre-counters 113, tap counters 114 and divided clock 115 as in circuit 100 could be used. However, according to another aspect of the present invention, the tap values in tap counters 514 preferably are not updated unless some number M≦P (see FIG. 6) of non-zero updates of pre-counters 513 has occurred within N clock cycles, where P is the maximum number of updates that can be counted by pre-counter 513 without overflowing. This prevents continual changing of the filter coefficients, which instead change only after a significant change in the tap values, reducing the computational load. In one embodiment, this may be accomplished by having each pre-counter 513 provide a tap value update of +1 or −1 to tap counters 514 as in the case of pre-counters 113 and tap counters 114, except that an update value of 0 (i.e., no update) is provided when the number of non-zero updates is less than M. Preferably, the number of updates in pre-counter 513 is reset after each update (or no-update) of tap counter 514. This is shown in circuit 500, where divided clock 515 clocks tap counters 514, but also is used to reset pre-counters 513. In a programmable device, each of M and N preferably is programmable.

In another embodiment, the incoming data could be sampled, and the error function could be applied, more than once per clock cycle or baud period. Because the input analog signal, even though it represents a digital value, may be rising or falling, gathering the error data more than once per baud period may provide useful information. In such a case, clock 515 would not only be divided by N, but also multiplied by Q, where Q is the number of samples per baud period (i.e., in an example of such an embodiment, $F_{divided}=QF_{clock}/N$). In a programmable device, the number of samples per baud period also could be programmable.

Thus it is seen that a blind adaptive DFE technique that does not require training, but has improved discrimination as between valid and erroneous signals, has been provided.

Figure 7:
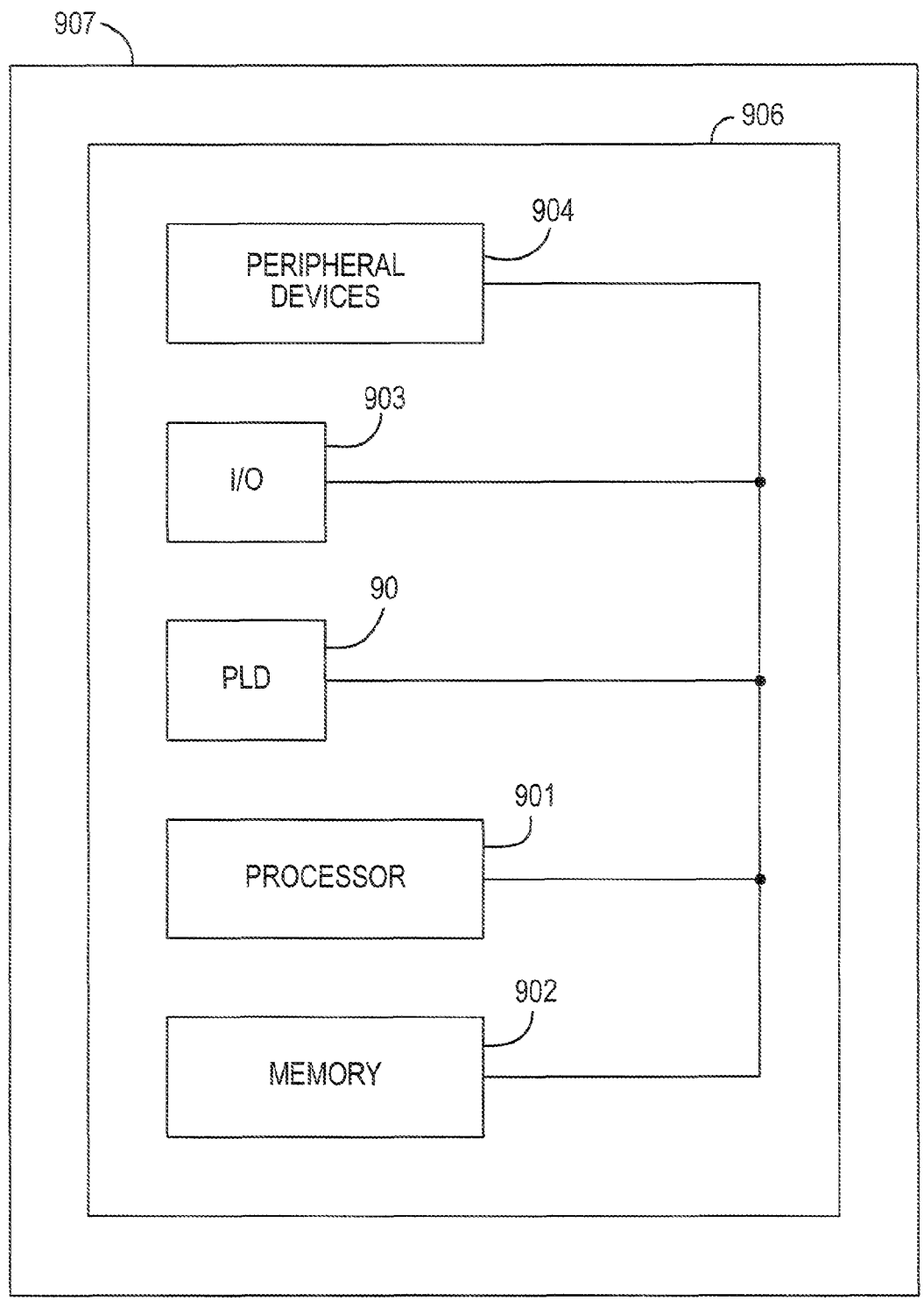
FIG. 7 is a simplified block diagram of an illustrative system employing a programmable logic device incorporating the present invention.

A programmable integrated circuit device such as a programmable logic device (PLD) 90, having a serial interface incorporating a blind adaptive DFE filter 500 according to the present invention, may be used in many kinds of electronic devices. One possible use is in a data processing system 900 shown in FIG. 7. Data processing system 900 may include one or more of the following components: a processor 901; memory 902; I/O circuitry 903; and peripheral devices 904. These components are coupled together by a system bus 905 and are populated on a circuit board 906 which is contained in an end-user system 907.

System 900 can be used in a wide variety of applications, such as computer networking, data networking, instrumentation, video processing, digital signal processing, or any other application where the advantage of using programmable or reprogrammable logic is desirable. PLD 90 can be used to perform a variety of different logic functions. For example, PLD 90 can be configured as a processor or controller that works in cooperation with processor 901. PLD 90 may also be used as an arbiter for arbitrating access to a shared resources in system 900. In yet another example, PLD 90 can be configured as an interface between processor 901 and one of the other components in system 900. It should be noted that system 900 is only exemplary, and that the true scope and spirit of the invention should be indicated by the following claims.

Various technologies can be used to implement PLDs 90 as described above and incorporating this invention. And although the invention has been described in the context of PLDs, it may be used with any programmable integrated circuit device.

It will be understood that the foregoing is only illustrative of the principles of the invention, and that various modifications can be made by those skilled in the art without departing from the scope and spirit of the invention. For example, the various elements of this invention can be provided on a PLD in any desired number and/or arrangement. One skilled in the art will appreciate that the present invention can be practiced by other than the described embodiments, which are presented for purposes of illustration and not of limitation, and the present invention is limited only by the claims that follow.

What is claimed is:

1. A blind adaptive decision feedback equalizer method for filtering an analog input data signal to provide a decided digital data output, said method comprising:
   storing a first plurality of previous decided digital data samples;
   summing said analog input data signal with a number of terms, equal to said first plurality, each derived from one of said previous decided digital data samples, to produce a filtered analog input data signal; and
   digitizing said filtered analog input data signal to produce said decided digital data output; wherein:
   each of said terms is derived by multiplying each respective stored previously decided digital data sample by a respective coefficient determined by:
   supplying to said filtered analog input data signal an error generation function that assigns (a) a first error value to a positive filtered analog input data signal having a magnitude less than a first threshold, (b) a second error value to a negative filtered analog input data signal having a magnitude less than said first threshold, and (c) a third error value to a filtered analog input data signal having a magnitude at least equal to said first threshold,
   applying said assigned error value and said respective stored previously decided digital data sample to respective adaptation logic to generate a respective coefficient update, and
   outputting each respective coefficient update to a respective coefficient.

2. The method of claim 1 wherein:
   said first error value and said second error value have identical magnitudes and opposite signs; and
   said third error value is zero.

3. The method of claim 2 wherein said first error value is −1 and said second error value is +1.

4. The method of claim 1 wherein said outputting comprises:
   accumulating said respective coefficient updates during a predetermined number of clock cycles; and
   outputting said accumulated respective coefficient updates only after a second plurality of respective updates has occurred.

5. The method of claim 4 wherein said data are sampled more than once per clock cycle and said second plurality is at most equal to the number of samples during said predetermined number of clock cycles.

6. A blind adaptive decision feedback equalizer method for filtering an analog input data signal to provide a decided digital data output, said method comprising:
   storing a first plurality of previous decided digital data samples;
   summing said analog input data signal with a number of terms, equal to said first plurality, each derived from one of said previous decided digital data samples, to produce a filtered analog input data signal; and
   digitizing said filtered analog input data signal to produce said decided digital data output; wherein:
   each of said terms is derived by multiplying each respective stored previously decided digital data sample by a respective coefficient determined by:
   applying an error generation function to said filtered analog input data signal to provide an assigned error value to said filtered analog input data signal,
   applying said assigned error value and said respective stored previously decided digital data sample to respective adaptation logic to generate a respective coefficient update,
   accumulating said respective coefficient updates during a predetermined number of clock cycles, and
   outputting said accumulated respective coefficient updates only after a second plurality of respective updates has occurred.

7. The method of claim 6 wherein said data are sampled more than once per clock cycle and said second plurality is at most equal to the number of samples during said predetermined number of clock cycles.

8. An equalization method for filtering an input signal, said method comprising:
   assigning a first error value to a positive input signal having a magnitude less than a first threshold;
   assigning a second error value to a negative input signal having a magnitude less than said first threshold;
   assigning a third error value to an input signal having a magnitude at least equal to said first threshold;
   applying said assigned error value to adaptation logic to generate a coefficient update;
   accumulating respective coefficient updates during a predetermined number of clock cycles; and outputting said accumulated respective coefficient updates only after a predetermined plurality of respective updates has occurred.

9. The method of claim 8 wherein:
said first error value and said second error value have identical magnitudes and opposite signs; and
said third error value is zero.

10. The method of claim 9 wherein said first error value is −1 and said second error value is +1.

11. A blind adaptive decision feedback equalizer that filters an analog input data signal to provide a decided digital data output, said blind adaptive decision feedback equalizer comprising:
memory that stores a first plurality of previous decided digital data samples;
a summing node that sums said analog input data signal with a number of terms, equal to said first plurality, each derived from one of said previous decided digital data samples, to produce a filtered analog input data signal;
a converter that digitizes said filtered analog input data signal to produce said decided digital data output; and
circuitry for deriving said terms, said circuitry comprising:
a respective multiplier that multiplies each respective stored previously decided digital data sample by a respective coefficient,
an error generator that assigns (a) a first error value to a positive filtered analog input data signal having a magnitude less than a first threshold, (b) a second error value to a negative filtered analog input data signal having a magnitude less than said first threshold, and (c) a third error value to a filtered analog input data signal having a magnitude at least equal to said first threshold, and
adaptation logic that acts on said assigned error value and said respective stored previously decided digital data sample to generate a respective coefficient update, each respective coefficient update being outputted to said respective coefficient.

12. The blind adaptive equalizer of claim 11 wherein:
said first error value and said second error value have identical magnitudes and opposite signs; and
said third error value is zero.

13. The blind adaptive equalizer of claim 12 wherein said first error value is −1 and said second error value is +1.

14. The blind adaptive equalizer of claim 11 further comprising:
registers for accumulating said respective coefficient updates during a predetermined number of clock cycles; and
counters for controlling output of said accumulated respective coefficient updates only after a second plurality of respective updates has occurred.

15. The blind adaptive equalizer of claim 14 wherein said data are sampled more than once per clock cycle and said second plurality is at most equal to the number of samples during said predetermined number of clock cycles.

16. A programmable integrated circuit device comprising a high-speed serial interface including the blind adaptive decision feedback equalizer of claim 14, wherein each of said second plurality and said predetermined number has a programmable value.

17. A programmable integrated circuit device comprising a high-speed serial interface including the blind adaptive decision feedback equalizer of claim 11, wherein said threshold has a programmable value.

18. A blind adaptive decision feedback equalizer that filters an analog input data signal to provide a decided digital data output, said blind adaptive decision feedback equalizer comprising:
memory that stores a first plurality of previous decided digital data samples;
a summing node that sums said analog input data signal with a number of terms, equal to said first plurality, each derived from one of said previous decided digital data samples, to produce a filtered analog input data signal;
a converter that digitizes said filtered analog input data signal to produce said decided digital data output; and
circuitry for deriving said terms, said circuitry comprising:
a respective multiplier that multiplies each respective stored previously decided digital data sample by a respective coefficient,
an error generator that assigns error value to said filtered analog input data signal,
adaptation logic that acts on said assigned error value and said respective stored previously decided digital data sample to generate a respective coefficient update, each respective coefficient update being outputted to said respective coefficient,
registers for accumulating said respective coefficient updates during a predetermined number of clock cycles, and
counters for controlling output of said accumulated respective coefficient updates only after a second plurality of respective updates has occurred.

19. A programmable integrated circuit device comprising a high-speed serial interface including the blind adaptive decision feedback equalizer of claim 18, wherein each of said second plurality and said predetermined number has a programmable value.

* * * * *